United States Patent [19]

Nakamura

[11] Patent Number: 5,296,176

[45] Date of Patent: Mar. 22, 1994

[54] METHOD OF MANUFACTURING A PARENT MATERIAL FOR WOODEN PATTERNS

[75] Inventor: Kenichi Nakamura, Hyogo, Japan

[73] Assignee: Industrial Technical R&D Laboratory Inc., Hyogo, Japan

[21] Appl. No.: 949,568

[22] Filed: Sep. 23, 1992

[30] Foreign Application Priority Data

Jan. 31, 1992 [JP] Japan .................................. 4-046067

[51] Int. Cl.$^5$ ............................................... B27N 3/00
[52] U.S. Cl. ..................................................... 264/109
[58] Field of Search ......................................... 264/109

[56] References Cited

U.S. PATENT DOCUMENTS

| | | | |
|---|---|---|---|
| 4,627,951 | 12/1986 | Shen ...................................... | 264/109 |
| 4,882,112 | 11/1989 | Maki et al. ........................... | 264/109 |
| 4,933,232 | 6/1990 | Trout et al. .......................... | 428/288 |
| 5,002,713 | 3/1991 | Palardy et al. ...................... | 264/109 |
| 5,064,592 | 11/1991 | Ueda et al. .......................... | 264/112 |

*Primary Examiner*—Mary Lynn Theisen
*Attorney, Agent, or Firm*—Koda and Androlia

[57] ABSTRACT

Disclosed is a parent material for wooden patterns which is made free of direction due to grain unlike in natural timber, stickiness caused by heat during cutting process unlike thermoplastic resin foam and microvibration due to foam, and which can prevent occurrence of distortion in the pattern made thereof, can afford so thick mold as more than 50 millimeter in spite of using wood flour as a base material and can be plated, and to provide a method of producing such a parent material. As base materials 50 to 70% by weight of 80 to 200 mesh wood flour and 30 to 50% by weight of a self-hardening resin constituted of a main resin, a hardening agent and an accelerator are used for kneading together and the mixture is subjected to molding under pressure at ordinary temperature so as to regulate water absorption to 3% or lower for every 24 hours for obtaining a product in specified size and in high density.

2 Claims, No Drawings

METHOD OF MANUFACTURING A PARENT MATERIAL FOR WOODEN PATTERNS

BACKGROUND OF THE INVENTION

1. Field of the Invention

The present invention relates to a parent material for wooden patterns to be used for the production of cast parts in car, machine and other parts and to a method of manufacturing it.

2. Description of the Prior Art

Previously the wooden model or pattern for making a sand cast mold for the production of cast parts has been made by using such natural timbers as Japanese white pine, red pine and magnolia after desiccating for a long years, and wax and other materials have been applied for moisture-proofing over the surface. In the case of mass production of cast mold a model (original pattern of cast mold) made of aluminium, brass or other metal or resin has been used in place of wooden pattern. In view of mechanical processibility and economy ABS foam, polyethylene foam, polypropylene foam and other synthetic resin foams made of thermosetting, synthestic resins have been utilized extensively as the parent material for making such wooden patterns, and such thermosetting, synthetic resin foams as of epoxy, phenol and polyurethane resins have also been used.

When natural timbers are used as the parent material for wooden patterns, they are required to be desiccated for a long period (longer than 10 years), and still the produced pattern shows distortion by swelling, contraction and others due to moisture absorption after some 6 months. Since natural timbers show direction of grain, which is the causative factor of the distortion, wood plates are layered alternately in regard to the direction of grain for preventing the distortion, but it has not been able to prevent it so far. It is also noted that the presence of grain and knot makes natural wood material heterogeneous, and it is a cause of such a shortcoming of difficulty in cutting during processing. Natural timbers also show limitation in the surface hardness being lower in comparison with metals, and they show relatively low contraction resistance and subsequently defectively inferior durability.

When aluminium, brass and other metals are used for making parent material for wooden patterns, processibility is satisfactory and excellent pattern (model) in regard to distortion and durability can be produced, but it is defective in being expensive.

Such above-stated synthetic resins as of ABS. polyethylene, polypropylene, epoxy, phenol and urethane are used in the foamed state for making the parent material for wooden patterns. The reason of using resin foams is that in processing of synthetic resins thermoplastic resins become sticky due to their melting by frictional heat of cutting blade during cutting, while thermosetting resins are so hard and fragile that cutting is difficult to do, and foamed resins have been employed for easier cutting. However, said synthetic resin foams often vibrate finely during cutting posing a problem of difficulty in high speed cutting. In addition the foamed thermoplastic resins are molded for making the parent material after melting similarly as with unfoamed ones, and they are molten by heating, extruded to fill forming mold and solidified by cooling, and during these processes the resins show internal stress that remains and works to move in the backward direction to the flowing direction. Accordingly the internal stress is liable to lose balancing during cutting the parent material for making pattern, and it causes occurrence of distortion.

On the other hand, when a wood-derived material consisting of wood flour and a binder of a thermosetting resin is used by the procedure with heating under pressure, there evolves the following problems. Thus, as the first problem, the presence of wood flour lowers heat conductivity so that hardening of the resin takes place only to 25 millimeter deep from the surface at the best. Therefore, the limit of the thickness of mold to be produced is 50 millimeter and when it is thicker than this limit the internal part deeper than 25 millimeter from the surface is not hardened remaining in a powdery state. (This is due to that containing more than 30% of wood flour lowers heat conductivity and that heat required by hardening does not reach the internal part.) Additional heating of the material in a dielectric heat dryer for hardening of this internal part should cause evaporation of moisture from this part, but the outer resin that has already been hardened does not pass the moisture with the result of swelling and distortion of whole material. The second problem is that due to elevation of temperature from the outer part during heating causing gathering of resin to the surface, the resin density at the contacting surface between the material and forming die becomes higher and subsequently the homogeneity of the outer and internal parts of the material is damaged. From these 2 reasons the wood-derived materials using thermosetting reins as binder are not homogeneous and inadequate for use as the parent material for wooden patterns.

SUMMARY OF THE INVENTION

The present invention has been completed in view of the above problems and has the object of providing a parent material for making wooden patterns by employing wood flour as the base material thus conserving the profitable feature of easy cutting like with natural trees, and it is free from the effect by grain direction, thermal deformation giving smooth cut surface and micro-vibration at cutting allowing high cutting speed, and is capable to produce molds homogeneous and so thick as more than 50 millimeter, to eliminate distortion derived from internal stress during processing to a wooden pattern, and to apply metal plating to afford the pattern with increased durability, thus contributing to lowering costs and shortening time required by the production of the wooden pattern, and this invention also relates to a method of manufacturing such a material.

To achieve the above object the parent material of wooden patterns of this invention is made by using in the base material at least 80 mesh pass of fine wood flour and by making it to combine with a self-hardening, thermosetting resin that is hardened at ordinary temperature to give a specified size of mold in high density and its water absorption is made 3% or lower for every 24 hours.

As the method of producing such a parent material for wooden patterns, this invention uses 50 to 70% by weight of a 80 to 200 mesh wood flour and 30 to 50% by weight of a self-hardening resin which is hardened without heating and is formed from a main resin, a hardening agent for hardening and accelerator for speeding up hardening, and the mixture is kneaded together and molded under pressure at ordinary temperature, and regulation is applied so as to make the water absorption 3% or lower for every 24 hours.

In the kneading of a self-hardening resin with wood flour in the production of a parent material for wooden patterns, a phenol resin composition is used as the main resin, a polyisocyanate composition as the hardening agent and a pyridine derivative composition as the accelerator, and it is effective to cause hardening at ordinary temperature of these 3 components by the urethane reaction.

Since a parent material for wooden patterns made as described above contains fine wood flour which is combined with a self-hardening thermosetting resin, it shows no direction due to grain unlike in natural timbers and does not become sticky by frictional heat from cutting blade during cutting unlike in the parent material of thermoplastic resin foam, and it improves cutting performance in processing of a wooden pattern, giving a smooth cut surface and reducing required hand finishing with sand paper. The wood flour particles are entangled each other to work to inhibit swelling and contraction, effecting to reduce thermal deformation of the pattern produced in this way. Containing no foamed material prevents micro-vibration from occurring during cutting thus contributing to the increase in cutting speed. The invention is also profitable in that a wooden pattern made from homogeneous and fine materials is free from distortion, shows high abrasion resistance and affords the pattern with good preservability. Since it uses a self-hardening resin that hardens at ordinary temperature, no heating into the internal part is required so that a parent material so thick as more than 50 millimeter may be obtained readily.

In addition, the surface of the wooden pattern made of the parent material of this invention is studded with numerous pits in size of the order of micron, and they work to fix metal plate and help to form a firm plate over the surface, and since said pattern has so low a water absorption as 3% or lower for every 24 hours it can avoid breaking during plating due to absorption of the plating solution, thus allowing plating to proceed under good conditions. Copper plating is most convenient to apply in this case, and layering in the order of Cu→Ni→Cr gives a beautiful surface finished by hard chromium plating. It is also noted that increased surface hardness of a wooden pattern by applying such a plating technique surely increases its service life against the friction with molding sand.

Plating of a wooden pattern made from the parent material of this invention increases the compressive strength of the pattern and improves sliding so that it may also be used as a low pressure press die, and since the heat conductivity is increased it may meet promptly demand of making a low cost test die replacing an aluminium die.

In the kneading of wood flour together with a self-hardening resin which is made of a main resin, a hardening agent and an accelerator for the combination in the production of the parent material for wooden patterns of this invention, the hardening of the main resin by kneading with a hardening agent is accelerated by the addition of an adequate amount of an accelerator causing subsequently increase in the hardening speed, and by molding under pressure the combination and molding in high density are possible. In this case, independently of the rates of wood flour and self-hardening resin, lowering of the density increases water absorption, and, for example, when the specific gravity is 0.8 and water absorption 3% for every 24 hours, plating will break the pattern so that it is no longer usable. With the same material higher density lowers water absorption, and when specific gravity is higher than 1.0 it will free wood workers from manual processing, and lowering of water absorption does not cause breakage and gives satisfactory plating. When the specific gravity is higher than 1.05 micro-vibration during mechanical processing is eliminated and plating is performed more readily since care is not required for floating up of the pattern on the surface of plating solution. Making wood flour finer (mesh) gives processed surface with better finishment.

In the kneading of wood flour with a self-hardening resin, a phenol resin composition is used as a main resin, a polyisocyanate composition as a hardening agent and a pyridine derivative composition as an accelerator, and kneading these 3 components together causes the urethane reaction, and the hardening speed is accelerated at ordinary temperature. (The self-hardening, phenol urethane resin is a fast-hardening product for which a patent has been filed by Ashland Oil Corporate, U.S.A. Related patents: Japanese Patent Applications No. 50873/1972, No. 25431/1973 and No. 17141/1974.)

DETAILED DESCRIPTION OF THE PREFERRED EMBODIMENTS

Below is given an example for more detailed explanation of this invention, in which a parent material for wooden patterns had a size of 550 millimeter wide, 1200 millimeter long and 100 m/m thick. It is noted that this invention is not limited by this Example at all.

For the production of the above parent material, raw materials are mixed by batch processing for several numbers of product at one time, and example of formulation is shown below:

| | |
|---|---|
| Wood flour, 100 mesh | 55.8 kg |
| Wood flour, 200 mesh | 55.8 kg |
| Phenol resin composition (main resin) | 29.925 kg |
| Polyisocyanate composition (hardener) | 31.5 kg |
| Pyridine derivative composition (accelerator) | 1.575 kg |
| Triethylphosphate (flame retardant powder) | 5.4 kg |
| (Triethylphosphaste may be replaced by ammonium bromide, hexabromobenzene, tribromophenol or other substances.) | |

The above 2 types of wood flour were weighed by using a weighing apparatus from each storing tank, added into a mixer (Capacity 1000 liters) equipped with a stirring wing on the bottom, which had been heated by steam in double-walled jacket, to conduct agitation and drying for decreasing the moisture of wood flour from 10 to 14% to about 3% remaining only the tissue moisture so as to make the resin to harden solidly. Then this mixed wood flour was transferred into a cooling mixer (capacity 1000 liters) equipped with a stirring wing on the bottom, which had been cooled by circulating water in jacket to cool it to a temperature below room temperature (lower than 30° C.). On the other hand, the liquid main resin of a phenol resin composition was weighed by a weighing apparatus from the storing tank and together with similarly weighed accelerator of a pyridine derivative composition and similarly weighed hardening agent of a polyisocyanate composition as well as a separately weighed flame retardant was added into the cooling mixer, and thoroughly mixed with the wood flour. Then thus stirred and kneaded materials in mixture were transferred into a storing tank and weighed to 69.3 kg±1% per a parent material by a weighing apparatus, and filled a press die in which they were hardened by applying a pressure of 60 kg/cm2 for 20 to 30 minutes for the production of a mold.

In this molding the above material which had been weighed to 69.3 kg after the above raw materials were mixed in a mixing line was placed into a female mold of a size of 550 millimeter wide×1200 millimeter long×300millimeter deep, and by compressing this by using a male mold to ⅓ a solidified product with a size of 550 m/m×1200 m/m×100 m/m was obtained. The time required by the material for self-hardening was 30 minutes. After hardening was over the male mold was elevated and the product was taken by raising a thrusting pin equipped in the female mold. The above example of formulation is for the case of producing a 3-face die by using a cooling mixer for 30 minutes of hardening time of the parent material for wooden patterns by successive batch processing of 210 kg each time which included a loss of 2 kg.

From a parent material for wooden patterns thus produced a product which had a strength for easy manual processing, showed 2.0 of water absorption and was capable to be plated was obtained, whose physical properties are shown in Table 1.

TABLE 1

| Item | Unit | Standard value |
|---|---|---|
| Specific gravity | | 1.05 |
| Bending strength | kg f/mm$^2$ | 4.63 |
| Elastic modulus at bending | kg f/mm$^2$ | 403.90 |
| Compressive strength | kg f/mm$^2$ | 6.45 |
| Elastic modulus at compression | kg f/mm$^2$ | 102.10 |
| Tensile strength | kg f/mm$^2$ | 2.32 |
| Elastic modulus under tension | kg f/mm$^2$ | 351.90 |
| Izod impact strength | kg f · cm/cm$^2$ | 4.45 |
| Water absorption | wt % | 2.00 |

The standard values in Table 1 are mean estimated values of several parent materials for wooden patterns.

In the above Example a parent material for a wooden pattern in a cube of a size of 550 millimeter wide×1200 m/m long×100 millimeter thick and with a specific gravity of 1.05, described; but it is also possible to produce by changing press die a round bar, half-round bar or other long parent materials with special cross sections. Furthermore, by changing the ratios of wood flour and self-hardening resin or raising the ratio of the resin, it is possible to increase the mechanical strength and by making the specific gravity 1.2 it is possible to increase the hardness. With such a product it is easier to do cutting in mechanical processing and increased hardness makes plating easier. Controlling the mesh of wood flour makes it possible to vary the extent of smoothness on the cut surface. In this way it is possible to provide desired parent material depending on the purpose of utilization.

A parent material for wooden patterns of this invention is free of direction due to grain unlike a parent material made of natural timber, stickiness caused by frictional heat during cutting unlike a parent material made of thermoplastic resin foam and micro-vibration due to foam in resins, and it can possibly contribute to improvement of cutting performance in processing for pattern and cutting speed. In addition, it is homogeneous, has high density and abrasion resistance and is free of distortion derived from the internal stress during cutting to pattern. Since a wooden pattern made from the parent material of this invention does not show distortion upon long standing, the pattern shows better preservability and makes it possible to be plated, and the plated pattern can replace an aluminium pattern; it is also possible to apply surface hardening on the pattern. Production of such a parent material so thick as more than 5 m/m and of such with round and other desired shapes is also possible. Consequently, the characteristics of the material makes full automation in the processing for pattern production possible, for example by using a 5-axial machining center for inputting data in the plan chart and setting the parent material of this invention, which has been made to adhere to a specified size, and thus the production of a wooden pattern can be sped up without involving skilled workers. Since the parent material can be plated, the plated material may speed up the production of simplified die, thus producing in several days a die model which previously required a month for production. Shortened time of producing experimental pattern will greatly contribute to development of new products. This invention also makes aluminium die unnecessary, and since it can shorten the period required by making die it can produce economical merit by reducing costs for the production of die and others.

According to the present invention regulation of water absorption to a specified level by kneading wood flour in a specified amount and with a specified mesh together with a self-hardening resin in a specified amount, which is made from a main resin, a hardening agent and a accelerator, makes it possible to produce a parent material for wooden patterns which is homogeneous and high in density and can be plated.

According to the present invention specification of the main resin, hardening agent and accelerator which constitute the self-hardening resin speeds up the hardening of the resin at ordinary temperature by using the urethane reaction, and can shorten the time required by the production of the above parent material for wooden patterns.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A method of manufacturing a parent material for wooden patterns, comprising the steps of:
    kneading together 50 to 70% by weight of 80 to 200 mesh wood flour and a main resin, a hardening agent and an accelerator for forming 30 to 50% by weight of a self-hardening resin; and pressure molding the kneaded product at ordinary temperature while controlling a pressure of said pressure-molding so that the coefficient of water absorption is 3% or lower for every 24 hours.

2. A method of manufacturing a parent material for wooden patterns as claimed in claim 1, wherein the kneading of a self-hardening resin with said wood flour is carried out by using a main resin of a phenol resin composition, a hardening agent of a polyisocyanate composition and an accelerator of a pyridine derivative composition and hardening is carried out by urethane reaction at ordinary temperature.

* * * * *